Figure 1:
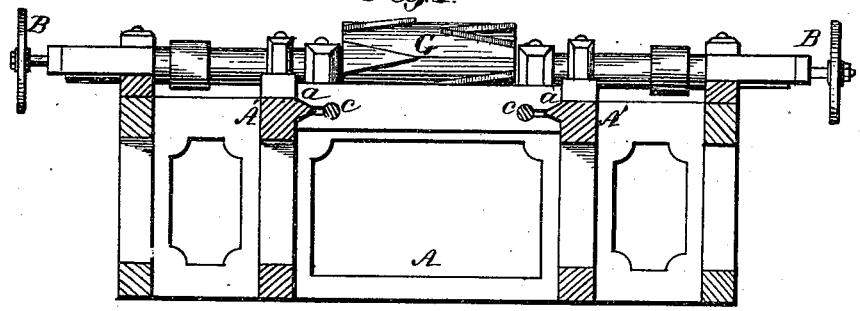

(No Model.) 3 Sheets—Sheet 1.

J. W. PHILP.
MACHINE FOR MANUFACTURING BARRELS.

No. 337,701. Patented Mar. 9, 1886.

Witnesses:—
W. E. Stearns
W. E. Chaffee

Inventor:—
John W. Philp
by his Attorneys
Johnson and Johnson (No Model.) 3 Sheets—Sheet 2.
J. W. PHILP.
MACHINE FOR MANUFACTURING BARRELS.
No. 337,701. Patented Mar. 9, 1886.
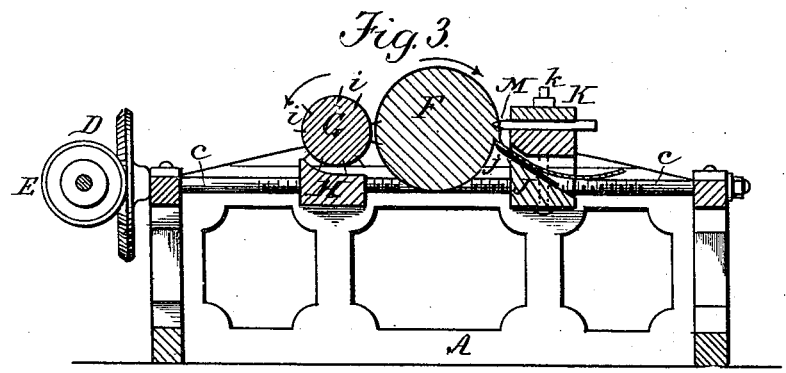
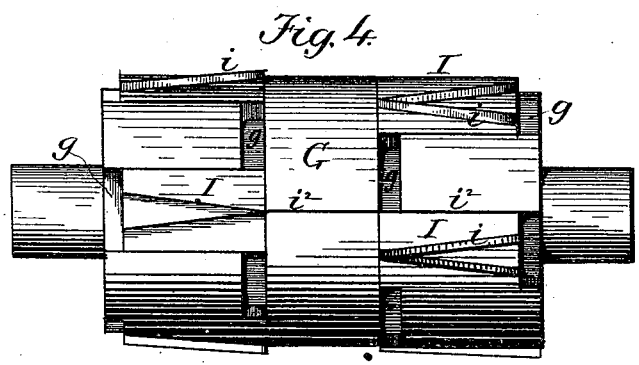
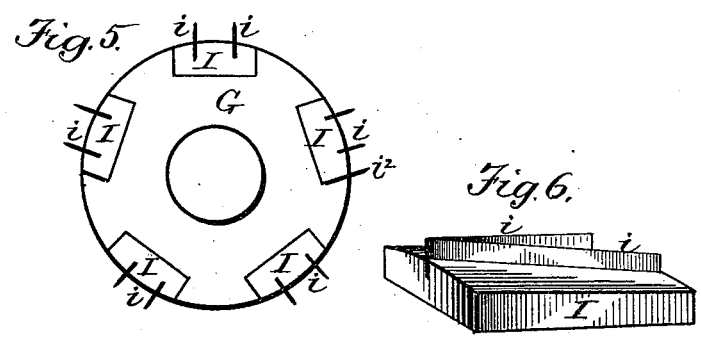
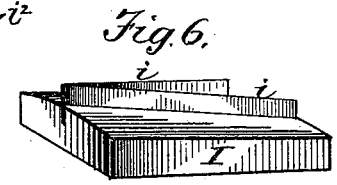
Witnesses:
Inventor:
John W. Philp
by his Attorneys
Johnson & Johnson (No Model.) 3 Sheets—Sheet 3.

J. W. PHILP.
MACHINE FOR MANUFACTURING BARRELS.

No. 337,701. Patented Mar. 9, 1886.

Witnesses:—
W. Steoma
W. E. Chaffee

Inventor:—
John W. Philp
by his Attorneys
Johnson and Johnson

UNITED STATES PATENT OFFICE.

JOHN W. PHILP, OF HUMBOLDT, TENNESSEE.

MACHINE FOR MANUFACTURING BARRELS.

SPECIFICATION forming part of Letters Patent No. 337,701, dated March 9, 1886.

Application filed August 24, 1885. Serial No. 175,233. (No model.)

*To all whom it may concern:*

Be it known that I, JOHN W. PHILP, a citizen of the United States, residing at Humboldt, in the county of Gibson and State of Tennessee, have invented new and useful Improvements in Machines for Manufacturing Barrels, of which the following is a specification.

My invention relates to improvements in barrel-making machines in which a veneer or barrel blank is cut from a log with the croze and the chine in a single sheet, ready to be formed, headed, and hooped. In such machines rollers having surface-knives and revolved by frictional contact with the revolving log have been used, in which the knives pierce the surface of the log to form separate staves, which are subsequently shaved as a veneer from the log, and at the same time have their ends formed with the croze, and with the chine on their inner or hollow sides. Similar veneer-producing machines have been used with such cutter-carrying rollers having surface-knives arranged to form bottle-wrappers and dish-blanks shaved from the log by a veneering-knife after the roller-knives have cut into the surface of the log by frictional contact.

In the machines for cutting barrel-veneer blanks from the log with the croze and chine, so far as I know and can find, such blanks must be subsequently gored to give the proper bulge to the barrel. Barrel-forming-veneer blanks have, however, been made with the bulge-forming gores; but so far as I know and can find barrel-making machines have not been constructed to produce the veneer from the log having the bulge-forming gores, the croze, and the chine at one and the same operation. In my improvement the construction of the roller knives gives the advantage of adjustment longitudinally to form longer or shorter gores to suit barrels of different lengths and to allow them to be removed from one end of the roller, so that blanks for forming kegs and buckets may be produced. In such machines I have improved the croze and chine forming cutters so that they make an upward cut into the downwardly-moving surface of the log, the cutters being curved downward from separate straight shanks and arranged just above the shaving-knife, so that they can be secured by a cap-plate and adjusted to suit the adjustment of gore-forming knives.

Figure 2:
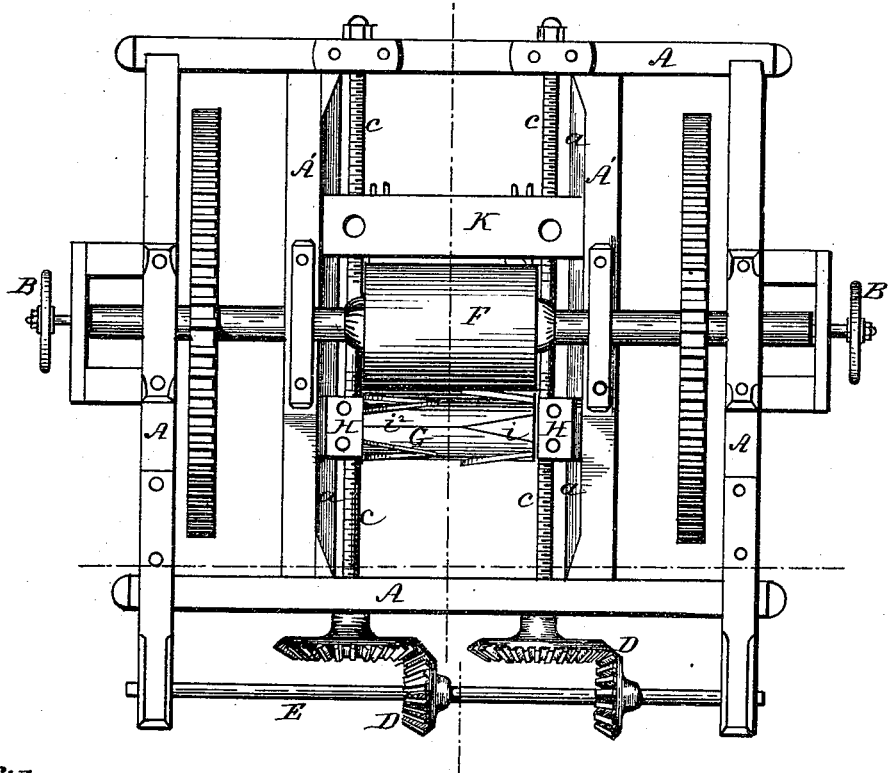
Figure 7:
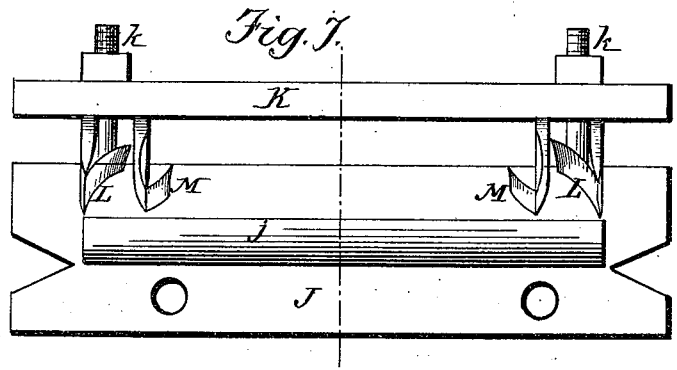
Figure 8:
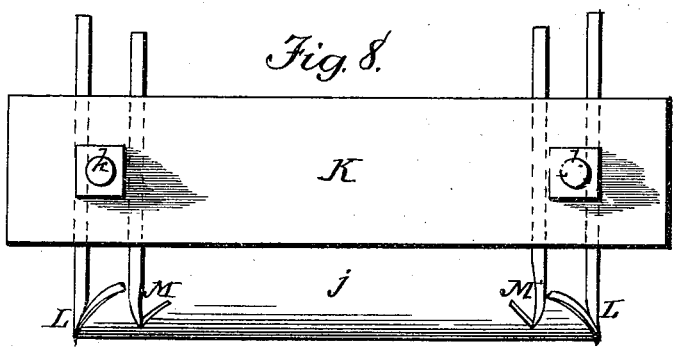
Figure 9:
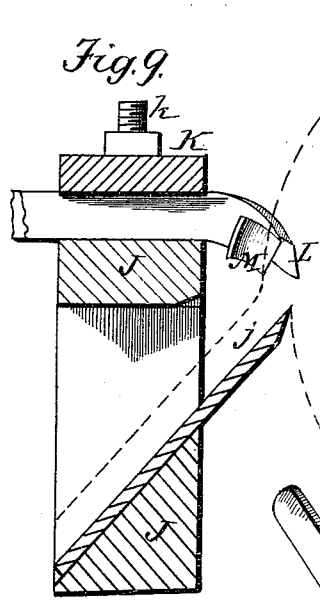
Figures 10, 11:
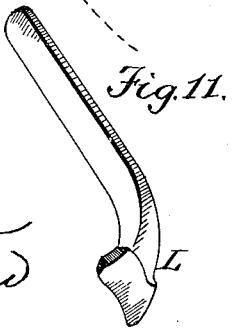

In the accompanying drawings, Figure 1 represents a sectional elevation of a veneer-producing machine embodying my improvements. Fig. 2 is a plan view of the same. Fig. 3 is a vertical cross-section; Figs. 4 and 5, the cylinder; Fig. 6, one of the cylinder-cutters. Figs. 7, 8, and 9 are side, top, and cross-sections of the follower and its cutters; Fig. 10, the crozing-tool; Fig. 11, the chining-tool, and Fig. 12 a portion of barrel-blank.

The detached figures are details on an enlarged scale of the knife-carrying cylinder, tool-holder, and crozing and chining tools, respectively.

The frame A, clutch-mandrels B, feed-screws c, gearing D, and shaft E are of ordinary construction, and are simply shown as a means whereby my improvements are carried into effective operation. The inner sides of the bars A' of the frame A are provided with ways a, on which the cutting-roller carriage and the tool-holder are mounted and free to move to and from the log F, being controlled in their movements by the feed-screws c, which pass through nuts in either end of the carriage and holder, respectively. The roller G is mounted in a suitably-constructed carriage or feed-block, H, and is provided with recesses g around its periphery, near each end, which recesses preferably extend to the ends and alternate those on one end with those on the other, as seen in Fig. 4, for the purpose presently referred to. Within these recesses are fitted blocks I, carrying V-shaped knives or cutters i, which project from the face of the blocks at right angles thereto for a suitable distance. Said blocks fit the sides of the recesses snugly, and are of a length to permit their longitudinal adjustment within the recesses, which is effected by driving the blocks to or from the middle of the length of the roller, or by any well-known means. The sides of the recesses may be dovetailed or undercut and the edges of the blocks made to correspond to prevent their accidental displacement; but in practice I have found that the straight sides give good results and are preferable, as they are less expensive in production. One of the knives has an extension, $i^2$, Fig. 4, which projects from its apex and comes flush with the opposite end of the roller, and is for the purpose of producing a separation of the veneer or blank.

The tool-holder or head-block consists of the part J, provided with the blade $j$ for separating the veneer from the log, and the clamping-plate K, between which and the part J is clamped the tools L M, by means of bolts $k$ and nuts, Figs. 7 and 8, one at either end of the head-block. The tools or cutters L and M are arranged in pairs, one tool of each pair being placed on either side of the bolts $k$, and as their shanks are of an equal width they are more securely held in place. The cutters are made of a single flat piece of metal with inwardly-projecting wings, to produce a croze or chine of sufficient width. The chine-cutters L have a cutting-edge projecting forward of their wings to cut the blanks of an equal width. The cutting portions of these tools are bent downward to effect a better and smoother cut, and reduce the strain on the clamp, which will thereby hold the tools firmer and prevent their slipping, as seen in Fig. 9.

In practice, a log being clamped between the clutch-mandrels and the latter set in motion, the head-block carrying the roller-cutter being previously adjusted so that the cutters will press or cut into the log the required distance, equal to the desired thickness of blank required, will, as the log rotates, rotate in unison therewith on its axis, by reason of its cutters pressing and cutting into the log, which operation is performed in advance of the action of the cutters carried by the other head-block, as clearly shown in Fig. 3. The log in its continued rotation will meet with the cutters L and M, which will cut the chine and croze of the barrel, after which the veneer or blank will be removed by the cutter $j$. It will be seen that the blank is made complete on one and the same machine, and as the V-shaped ends therein alternate the blank is not so readily broken. (See Fig. 12.)

The advantage of having the blank cut while integral with the log, so as to form the croze and chine, and permit the proper bulge when set up, is to avoid the extra expense of handling, and prevent the waste of material, which so often occurs where the veneer is first cut and afterward formed into a barrel-blank by crozing, &c.

The feed-screws $c$ have a right and left thread on their opposite ends, and as the head-blocks are disposed one on either side of the log they are gradually fed thereto by motion being imparted to the shaft E proportionately to the motion of the log, in order to cut continuously and of a given thickness.

Figure 12:
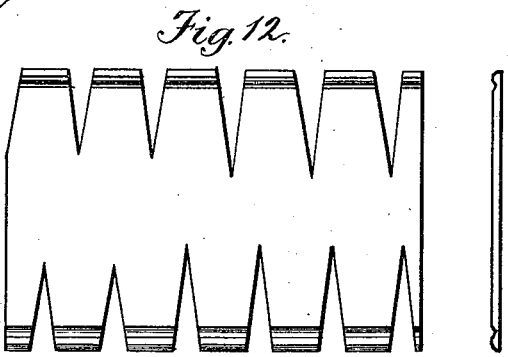

The chining-tools may be adjusted longitudinally of their head-block to cut blanks of varying width, and the knives in the roller may likewise be adjusted to produce cuts for varying the bulge of the barrel, keg, &c., when set up, as seen in Fig. 12.

The roller is made interchangeable for others of larger or smaller diameter and of different pattern, in order to produce buckets, &c., as well as kegs or barrels.

When it is desired to produce blanks for buckets, &c., requiring only a single head, only one end of the roller is used, or a roller may be employed carrying only a single peripheral set of knives, and only one pair of knives for crozing and chining are necessary.

It will be understood that the cutting-roller is operated solely by the rotation of the log, and that this is an important feature of my invention, which embraces in combination means for producing from a revolving log barrel-forming blanks having the croze, the chine, and the bulge-forming gores.

The croze and chine forming cutters have straight flat shanks, which are clamped edgewise between the head-block J and the cap-plate K, so that their cutting-ends curve downward to give an upper cut in the surface of the downwardly-revolving log. They can be set separately sidewise and lengthwise, and they are secured firmly upon the top surface of the head-block by the single clamping-plate J and its clamping-bolts.

In Fig. 12 the gores of the blank are shown of different length, to give the required bulge to barrels of different lengths; and it is for this purpose that the roller-knives are adapted for longitudinal adjustment, as stated. Moreover, the provision of separate blocks for the separate V-shaped knives allows them to be easily adjusted, and to be readily and cheaply secured to the roller, to be removed for sharpening, and to be easily replaced in the roller by others.

I claim—

1. In machines for manufacturing barrels, the combination, with the veneer-separating and the croze and chine forming knives, of the roller G, having gore-forming cutters $i$, arranged on each end thereof, and means for feeding said knives and roller to the log, whereby to produce barrel-forming blanks from a log at one operation, having the croze, the chine, and the bulge-forming gores, substantially as described.

2. In machines for manufacturing barrels, the roller G, having longitudinal surface recesses $g$ around its periphery at each end; those in one end alternating in longitudinal line with those in the other end, in combination with blocks I, contained within said recesses, having V-shaped knives $i$ projecting from their surfaces, and mechanism for feeding said roller to the log, substantially as described, for the purpose specified.

3. In machines for manufacturing barrels, the combination of the roller having longitudinally-adjustable cutter-carrying blocks I, arranged at each end in longitudinal recesses $g$, alternately, as described, with a head-block, J, having a knife, $j$, for separating the veneer from the log, the separate crozing-cutters M, and the separate chine-forming cutters L, means whereby these croze and chine forming cutters are made adjustable, and mechanism for causing said roller and head-block to be fed to the log, substantially as described.

4. In a machine for making barrel-blanks from a log, the head-block J, having the knife j for separating the veneer, the adjustable tools L and M, the clamping plate K, and bolts k, in combination with the roller having adjustable V-shaped knives, and mechanism for causing said head-block and roller to simultaneously approach the log, whereby the roller-knives may be adjusted to form bulge-gores suited to the length of the barrel and to the set of the croze and chine cutters, as herein set forth.

5. The roller G, having V-shaped knives secured in independent carriers placed in alternate longitudinal relation upon its surface around each end, adjustable lengthwise of the roller, wherby to cut the gores in the veneer of greater or less length to give the desired bulge to the barrel, according to its length, said roller having a non-adjustable knife, as and for the purpose set forth.

6. The roller G, having V-shaped surface-knives secured in independent carriers arranged around one or both ends of said roller, combined with the tools for cutting the veneer from the log and for forming the croze and the chines, all constructed and arranged for operation as set forth.

7. The combination, with the roller having the gore-forming knives, of the crozing and chining cutters having straight shanks, and downwardly-curved ends supplementing the shaving-knife j, as shown and described.

In witness whereof I have hereunto set my hand in the presence of two subscribing witnesses.

JOHN W. PHILP.

Witnesses:
L. D. WADDILL,
JAMES I. WALLIS.